Feb. 20, 1951 S. P. KINNEY ET AL 2,542,681
GAS WASHER
Filed June 23, 1945 3 Sheets-Sheet 1
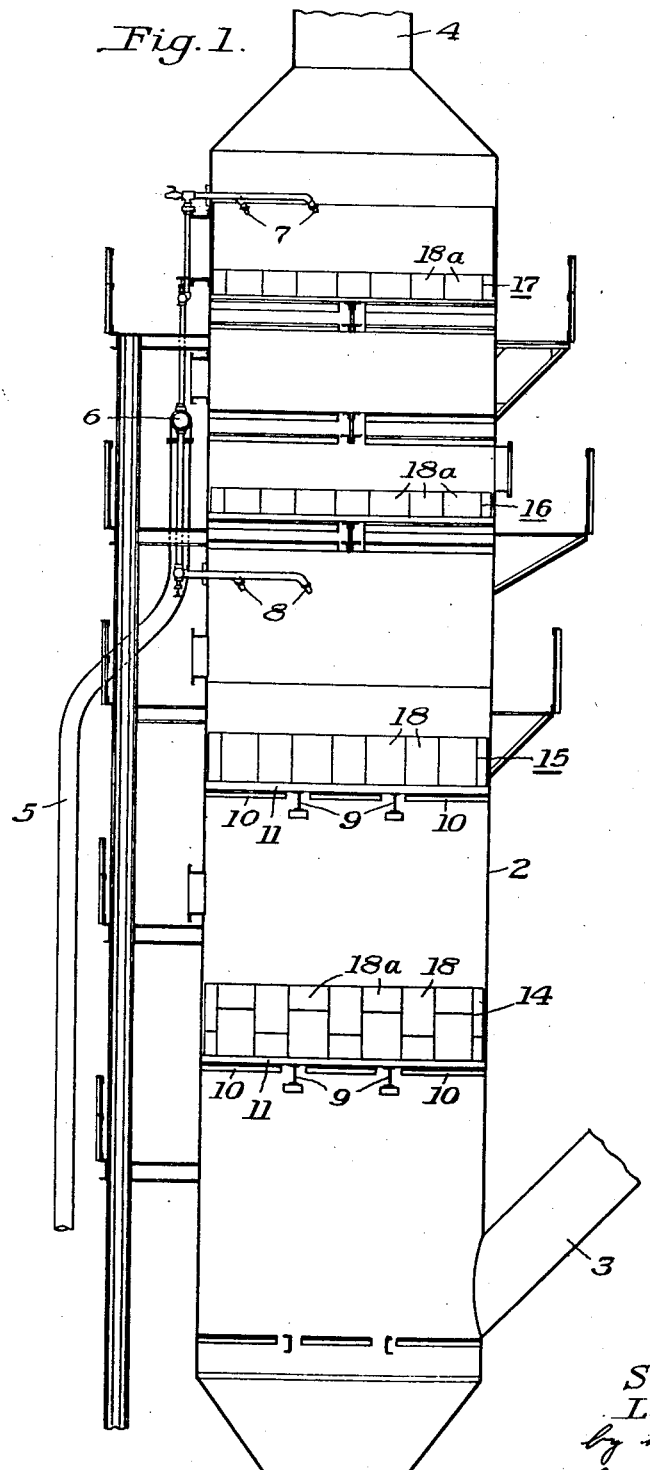
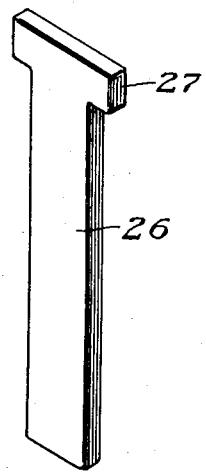
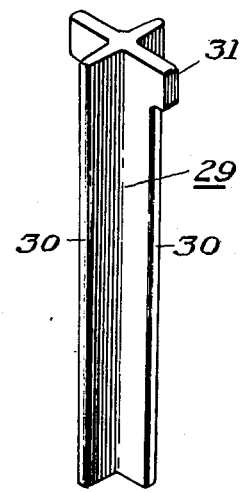
INVENTORS
Selwyne P. Kinney
Louis M. Hartwick
by his attorneys
Christy, Parmelee & Strickland

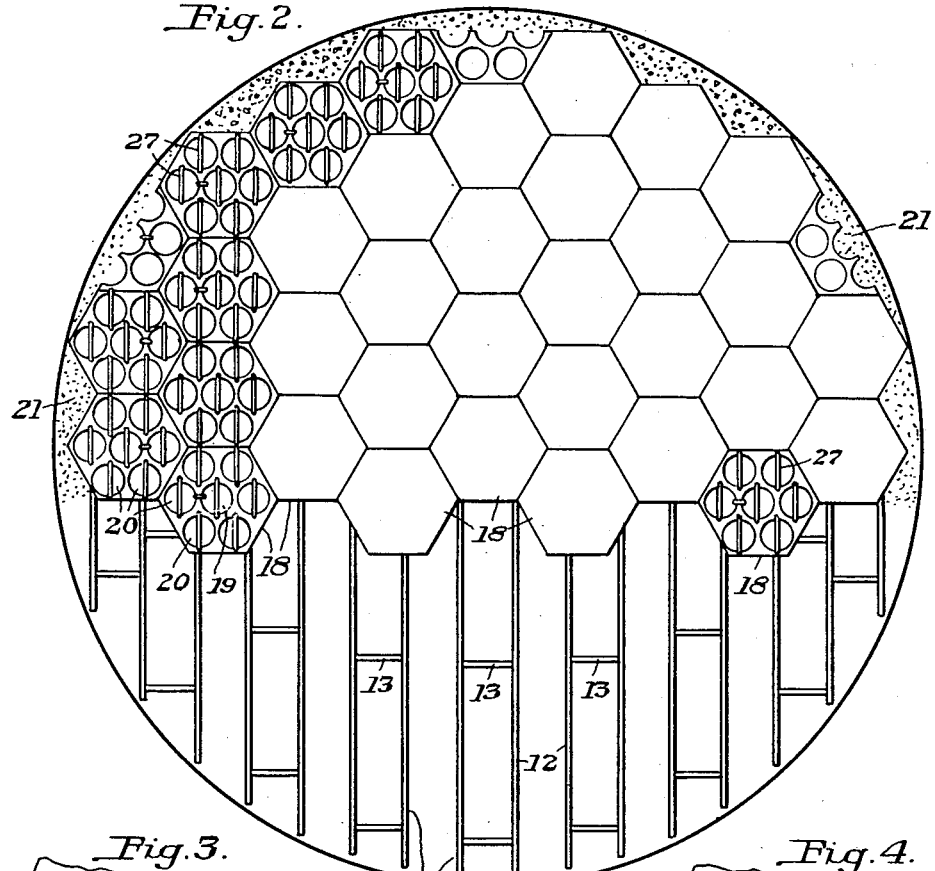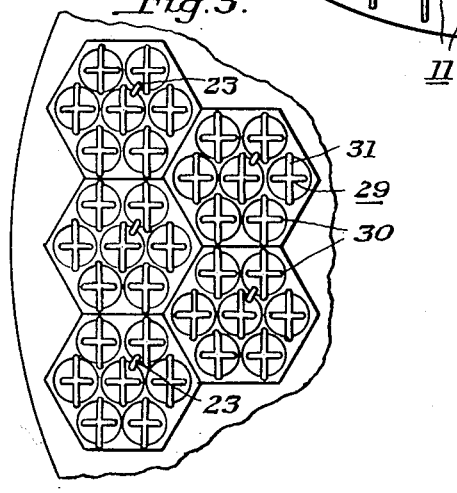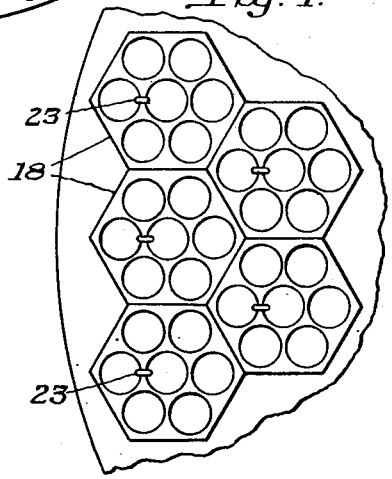

Feb. 20, 1951 S. P. KINNEY ET AL 2,542,681
GAS WASHER
Filed June 23, 1945 3 Sheets-Sheet 3
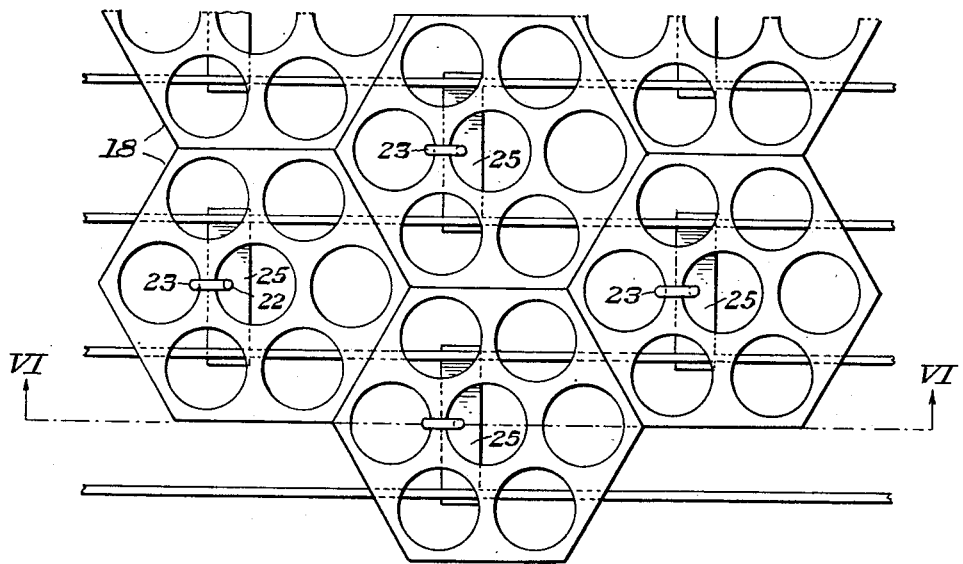
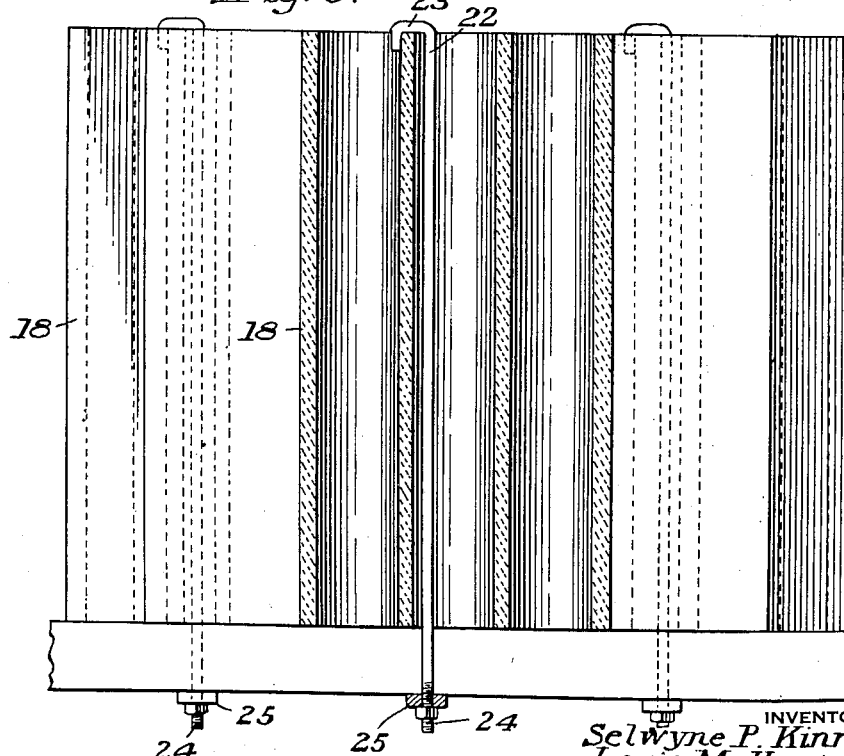
INVENTORS
Selwyne P. Kinney
Louis M. Hartwick
by his attorneys
Christy, Parmelee-Strickland Patented Feb. 20, 1951

2,542,681

UNITED STATES PATENT OFFICE 2,542,681

GAS WASHER

Selwyne P. Kinney, Crafton, and Louis M. Hartwick, Beaver, Pa., assignors, by mesne assignments, to S. P. Kinney Engineers, Inc., Pittsburgh, Pa., a corporation of Pennsylvania Application June 23, 1945, Serial No. 601,130

5 Claims. (Cl. 261—95)

This invention relates to gas washers, especially gas washers of the type known as primary gas washers for the cleaning of blast furnace gases, but is useful for cleaning other gases, and is for an improved gas and water contacting medium for washers of this kind.

The usual primary gas washer comprises a hollow tower structure and the gas to be cleaned is introduced at the bottom and taken off at the top. Water is introduced into the tower at one or more levels starting at the top of the tower, being sprayed into the tower and flowing in a direction counter to the gas. Usually, at spaced levels there are banks or beds of tile through which the gases rise and through which the water trickles. Commonly the tiles are of small size being supported on a heavy wire screening, with a similar screening over the tops of the tiles to restrain them from displacement when a "slip" in the blast furnace produces a sudden surge in the gas entering the washer. The disintegration of these screens is a source of frequent failure. Successive banks of tile are of like construction.

The present invention provides an effectively different contacting medium in different banks of tile while employing basically uniform tile throughout. Additionally the present invention eliminates the customary screens and provides an improved construction for retaining the tiles in position. Also the invention provides a more effective arrangement of the tiles.

According to our invention the tiles are made in two lengths, one of which is a multiple of the other and all of the same sectional size and shape with a plurality of openings therethrough. The cross-sectional shape is such that the tiles may be fitted in face-to-face contact with no intervening spaces. Variation in the effect of the tiles, at different elevations, which are alike except for being of the two lengths above mentioned, is provided by fillers or inserts set into the passageways in the tiles.

Our invention may be more fully understood by reference to the accompanying drawings in which:

Fig. 1 is a longitudinal vertical section through a washer embodying my invention;

Fig. 2 is an incomplete plan view of one bank of tiles, not all of the tiles being in place and some of the tiles being indicated only in outline;

Fig. 3 is a fragmentary plan view of another bank with inserts in place different from Fig. 2;

Fig. 4 is a similar view with no inserts;

Fig. 5 is a fragmentary plan view on a larger scale of a portion of a bank of tiles;

Fig. 6 is a vertical section in the plane of line VI—VI of Fig. 5;

Fig. 7 is a perspective view of one of the insert elements; and

Fig. 8 is a similar view of another insert.

Referring to the drawings, the washer shown in Fig. 1 is generally typical of structures of this kind, except for the features hereinafter especially pointed out. There is a cylindrical tower 2 with a gas inlet 3 near the bottom thereof, and which has a washed-gas off-take pipe 4 at the top thereof.

A water supply pipe 5 delivers water under pressure to a manifold 6 and the manifold 6 in turn supplies water to a system of nozzles 7 and another system of nozzles 8, these nozzles being of a conventional form adapted to produce cone sprays which substantially cover the full area of the tower. The sprays 7 are at the top of the tower and the sprays 8 are at an intermediate level. Other arrangements may be employed.

Extending across the tower at various elevations are I-beams 9, and secured to the walls of the tower by welding or other suitable means are angle strips 10. The I-beams 9 and the strips 10 support a grating structure 11 of conventional form, formed from metal bars. The grating shown in the drawings has parallel longitudinally extending bars 12 and interconnecting short crossbars 13, but any other appropriate form of grating may be substituted. The bars are spaced from each other a distance greater than the diameter of the openings, the horizontal width of the bars being less than the diameter of the openings. By reason of this arrangement the bars cannot obstruct any of the openings completely and offer a minimum impedance to all of the openings. These gratings serve to support banks of tiles. The lowermost bank of tile is designated 14. The next bank is 15, and 16 is another bank of tile immediately above, while 17 is the uppermost bank. Four of these banks of tiles are shown, but there may be any suitable number, depending upon the size and design of the gas washer.

All of the tiles used in all of the banks are of the same cross sectional shape and size. They are preferably polygonal with the sides so shaped or arranged that the blocks may be set in face-to-face contact without any intervening spaces that have to be filled in with cement. As shown in Figs. 2 and 5 particularly, these tiles are preferably hexagonal in shape. Each tile 18 has a central passageway 19 therethrough, and surrounding the passage 19 is a circular series of passages 20, the passages 19 and 20 being of the same size. In a hexagonal tile of the type shown, seven passages are provided in each tile. The minimum diameter of any of the tiles is greater than the spacing between the bars of the grate 11 so that the tiles may set directly on the grate and be supported thereby, each tile resting on at least two grating bars. The combined area of the opening in the tile is greater than the cross sectional area of the solid structure, giving a large area of passageway per unit of weight. The heavy, rigid grating takes the place of the screen that has heretofore been used and provides a substantial support for the tiles. The tiles may be fitted in over substantially the entire area of the grating as shown in Fig. 2, but around the periphery half tiles may be used at intervals, and cement 21 may be filled in to fill up the shapes between the tiles and the inside of the tower casing.

The tiles may be held in place as shown in Fig. 6 by means of a rod 22 that has a hook portion 23 at the top thereof, and the lower end of which is threaded at 24. The threaded end 24 is passed through a crossbar 25 which spans the distance between two of the grating bars 12. A nut on the lower end of the threaded rod may then be tightened up, thus clamping the tile onto the grating. This prevents dislodgement of the tiles in the event of a slip occurring in the blast furnace such as will produce a surge of pressure upwardly in the washer. These rods replace the screening that is customarily placed over the tops of the tiles and are much more effective for preventing movement or the shifting of the tiles and are substantially more durable. The rods may be quickly installed. The hook 23 of course engages over the partition separating the central hole from one of the surrounding holes.

Preferably the tiles are made in two lengths so that with a minimum of mold cost, a variety of conditions can be met in different banks of tiles. As shown in Fig. 1, the tiles 18 are twice as long as the tiles 18a, but of the same cross sectional area. The tiles 18a are preferably just half the length of the tiles 18. In the bank of tiles constituting the bank 14, a long length of travel of gases through the tiles is desired so that short and long tiles are used together, there being a short tile at the bottom of one column and a long tile at the bottom of an adjacent column so that the joints break horizontally across the entire section of the tower as clearly shown in Fig. 1, but the tops of all of the tiles are at the same level. As an example, the tiles 18 may be 24 inches long, and the tiles 18a 12 inches long, so that the total length provided by the two tiles together is 36 inches.

The lowest bank of tile 14 is first encountered by the incoming gas, in which there is a maximum of dust and solid particles, hence the openings through the tiles provide a relatively free passage for the gas vertically, but there is a long wall surface provided by the holes in the blocks along which the downwardly-flowing water and the upwardly-flowing gas may contact to remove most of the coarse material without likelihood of clogging the openings 19 and 20.

After passing through the first bank of tiles the volume of the gases has been reduced by the cooling which has occurred, and the gas has been rough cleaned by its passage through the first bank of tile. Therefore the second bank of tile 15 from the bottom is preferably comprised only of a course of the longer tile 18. Since the burden of impurities is less, there is less likelihood of clogging and therefore inserts 26 (see Fig. 7) are set in the holes through these tiles, these inserts comprising flat ceramic bars with a T-shaped head 27, the head being longer than the diameter of the holes so that lugs are formed by which the inserts are suspended from the tops of the multiported tiles, forming a simple and effective manner of suspending them. The inserts, while cutting down to some extent the free area of the ports or passageways through the tiles, increase the area for a contact between the gases and water to more thoroughly scrub the gas. However, since the burden of impurities has been substantially reduced, there is little likehood of the tiles in the second bank, even though they are provided with these inserts, becoming clogged. The inserts are of a type which are really self-cleaning, because all surfaces are in a plane. Also since the gases are cleaner, the length of the tiles constituting this bank is shorter.

After passage through the second bank of tiles the volume of gases is further reduced and the amount of impurities is substantially less. Hence in the banks of tiles designated 16 and 17, these being the two uppermost banks, tiles of the shorter length are used, these being the tiles 18a. They are of course identical with the tiles 18a in the lowermost bank. However they are provided with an insert which presents a greater area than the insert shown in Fig. 7. A typical insert used in the uppermost banks of tiles is shown in Fig. 8 and is designated 29. It is of star or cross shape having a plurality of radial vanes 30, preferably four of these vanes being used. Two diametrically opposite vanes have an extended top portion 31 corresponding to the top portion 27 in Fig. 7 and providing lugs that rest on the top of the tile and thus hold the inserts in place. Because of the greater surface of these inserts the gases are brought into more intimate contact with the water, but because of the greater obstruction which they offer to the gases, the passageways are shorter, that is, shorter tiles are preferably used. The inserts of greater area can be used in these positions without danger of clogging due to the fact that the coarser and more readily extracted impurities constituting the bulk of the impurities have been removed in the first two vanes and the water is cleaner. Due to the straight sided formation of the inserts they are relatively self-cleaning in that they have flat vertical surfaces and may be glazed, as may also be the tile, and also the inserts 26, whereby there is a tendency for any accumulations to be washed away.

Another important advantage of our invention is that the inserts may be easily removed for cleaning the holes in the tile when this becomes necessary. Occasionally, in the operation of a washer, the flow of water will be interrupted or water "will be lost." When this happens, the reduced, or to use the parlance of the art, the holes quickly clog up, and the removable inserts of our invention may, in such case, be easily removed for cleaning the openings.

By providing large tiles with a multiple of openings therethrough rather than a plurality of small tiles with a single opening, the shapes of the tiles can be more advantageously designed for economical manufacture and for setting the tiles in face-to-face contact without requiring intermediate masses of cement or filling material. The larger tiles can be arranged advantageously on a larger and more corrosive-resistant support and they can be individually anchored in place as shown. Also by the use of inserts, different conditions of contact between the gases and water can be provided in different banks of tiles while using the same basic tile shape in all banks. The inserts are relatively inexpensive and easily applied. At the same time different conditions provided in different banks are suited to the performance which is to be attained in the different banks. That is to say, that conditions of contact may by this invention be different in the lower part of the washer where the volume of gases is larger, the velocity of gases is higher, the amount of impurities greater, and the water is contaminated, than the conditions which prevail in the upper part of the washer where the gases are cooled and the volume reduced, there is a lower velocity and the impurities are less easily removed and the volume of impurities is substantially less. Also in the upper part of the tower the water is cleaner. The present invention provides an economical way of providing the different contacting media in different banks with a minimum of variation from a basic design.

While we have illustrated and described particular tile shapes and a particular embodiment of our invention, it will be understood that this is by way of illustration, and that various changes and modifications may be made within the contemplation of our invention and under the scope of the following claims.

We claim:

1. A gas washer comprising a casing constituting a vertical tower, a plurality of gratings supported at different levels in the tower forming vertically spaced horizontal platforms, a course of tiles set vertically on each grating, said tiles being hexagonally shaped and having a central cylindrical opening extending axially therethrough and with a plurality of cylindrical openings symmetrically arranged about the central one, the total area of the openings being relatively large as compared to the overall section of the tile, the tiles on all of the gratings being of the same cross sectional shape and size, and inserts in the openings of the tiles on some of the gratings, the tiles on some of the gratings near the top of the tower being shorter in vertical height than the tiles lower down.

2. A gas washer comprising a casing constituting a vertical tower, a plurality of gratings supported at different levels in the tower forming vertically spaced horizontal platforms, a course of tiles set vertically on each grating, said tiles being hexagonally shaped with plane sides and having a central opening extending axially therethrough, a plurality of openings symmetrically arranged about the central one, the total area of the openings being relatively large as compared to the overall section of the tile, the tiles in all of the gratings being of the same cross sectional shape and size, and inserts in the openings of the tiles on some of the upper gratings, the lowermost course of tiles being comprised of a short and long tile in superimposed relation, an intermediate course of tile being comprised only of the longer tiles and the uppermost course of tiles being comprised of the shorter ones.

3. A gas washer comprising a casing constituting a vertical tower, a plurality of gratings supported at different levels in the tower forming vertically spaced horizontal platforms, a course of tiles set vertically on each grating, said tiles being polygonally shaped and having a central opening extending axially therethrough, a plurality of openings symmetrically arranged about the central one, the total area of the openings being relatively large as compared to the overall section of the tile, the tiles in all of the gratings being of the same cross sectional shape and size, and inserts in the openings of the tiles on some of the gratings, the lowermost course of tiles being comprised of a short and long tile in superimposed relation, an intermediate course of tile being comprised only of the longer tiles and the uppermost course of tiles being comprised of the shorter ones, the inserts in the uppermost course of tiles having a greater surface area than the inserts in an intermediate course, the openings in the lowermost course of tiles in the tower being fully open.

4. A gas washer comprising a tower having a plurality of horizontal courses of tiles at vertically spaced intervals, all of the tiles being of the same cross sectional shape and size, each tile having a plurality of vertical openings therethrough, and inserts in the openings of some of the courses of tile, the inserts being formed of ceramic material providing flat fins and having lugs at the top thereof by means of which they are suspended in the openings in the tiles.

5. A gas washer comprising a tower having a plurality of horizontal courses of tiles at vertically spaced intervals, all of the tiles being of the same cross sectional shape and size, each tile having a plurality of vertical openings therethrough, and inserts in the openings of some of the courses of tile, the inserts being formed of ceramic material providing flat fins and having lugs at the top thereof by means of which they are suspended in the openings in the tiles, the inserts used in the intermediate course being in the form of flat strips having a width substantially equal to the diameter of the openings in the tile, the inserts for the uppermost course having intersecting substantially flat fins, the inserts projecting above the tops of the tiles and having means thereon engaging the tops of the tiles by which they are held in suspension in the openings.

SELWYNE P. KINNEY.
LOUIS M. HARTWICK.

REFERENCES CITED

The following references are of record in the file of this patent:

UNITED STATES PATENTS

| Number | Name | Date |
|---|---|---|
| 244,997 | Kennedy | Aug. 2, 1881 |
| 366,394 | Hardenbergh | July 12, 1887 |
| 376,951 | Hain | Jan. 24, 1888 |
| 1,132,679 | Murray et al. | Mar. 23, 1915 |
| 1,365,671 | Fairlie | Jan. 18, 1921 |
| 2,039,540 | Seaver et al. | May 5, 1936 |
| 2,054,315 | Ebner et al. | Sept. 15, 1936 |
| 2,291,252 | Norris | July 28, 1942 |

FOREIGN PATENTS

| Number | Country | Date |
|---|---|---|
| 15,291 | Great Britain | June 30, 1911 |
| 560,882 | France | Oct. 12, 1923 |